United States Patent
Katayama et al.

(10) Patent No.: US 11,479,673 B2
(45) Date of Patent: Oct. 25, 2022

(54) METHOD FOR PRODUCING LANTHANUM HEXABORIDE-CONTAINING COMPOSITE PARTICLES AND METHOD FOR PRODUCING FORMED PRODUCT

(71) Applicant: AGC Inc., Chiyoda-ku (JP)

(72) Inventors: Hajime Katayama, Chiyoda-ku (JP); Hiroshi Aruga, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 460 days.

(21) Appl. No.: 16/572,975

(22) Filed: Sep. 17, 2019

(65) Prior Publication Data
US 2020/0010684 A1  Jan. 9, 2020

Related U.S. Application Data (63) Continuation of application No. PCT/JP2018/016479, filed on Apr. 23, 2018.

(30) Foreign Application Priority Data

May 1, 2017 (JP) .................................. 2017-091393

(51) Int. Cl.
*C09C 1/00* (2006.01)
*C08J 3/20* (2006.01)
(Continued)

(52) U.S. Cl.
CPC .................. *C09C 1/00* (2013.01); *C08J 3/203* (2013.01); *C08K 3/38* (2013.01); *C08K 9/06* (2013.01);
(Continued)

(58) Field of Classification Search
CPC ..... C09C 1/00; C08K 3/38; C08K 9/06; C08J 3/203; C01P 2004/04; C01P 2004/80;
(Continued)

(56) References Cited

U.S. PATENT DOCUMENTS

| 5,767,219 A * | 6/1998 | Takarada ............... C08G 77/46 528/31 |
| 2006/0009559 A1* | 1/2006 | Fujita ....................... C09D 5/32 524/404 |
| 2015/0361242 A1* | 12/2015 | Nakamura ............... A61K 8/19 106/459 |

FOREIGN PATENT DOCUMENTS

| JP | 2004-43764 A | 2/2004 |
| JP | 2004043764 A * | 2/2004 ............... C08J 5/18 |

(Continued)

OTHER PUBLICATIONS

International Search Report dated Jul. 24, 2018 in PCT/JP2018/016479 filed Apr. 23, 2018 (with English translation).

*Primary Examiner* — Bijan Ahvazi
(74) *Attorney, Agent, or Firm* — Oblon, McClelland, Maier & Neustadt, L.L.P.

(57) ABSTRACT

To provide a method for producing lanthanum hexaboride-containing composite particles which are capable of forming a formed product having sufficiently high transparency and which are excellent in weather resistance, by a simple operation without calcination treatment at high temperature, and a method for producing a formed product using it. Also provided is a method for producing composite particles, which involves: reacting at least one silica precursor selected from a tetraalkoxysilane, its hydrolysate and its condensate, in the presence of lanthanum hexaboride particles, a volatile base, water and an organic solvent to obtain a first reaction mixture, and reacting the first reaction mixture with at least one silicon compound selected from an amino-modified silicone, an alkylsilane and an aminosilane, or the silicon compound and the silica precursor added, to obtain a second reaction mixture containing lanthanum hexaboride-containing composite particles.

16 Claims, 4 Drawing Sheets

(51) Int. Cl.
  *G02B 5/20*  (2006.01)
  *C08K 3/38*  (2006.01)
  *C08K 9/06*  (2006.01)
(52) U.S. Cl.
  CPC .......... *G02B 5/208* (2013.01); *C01P 2004/04* (2013.01); *C01P 2004/80* (2013.01); *C01P 2006/12* (2013.01); *C01P 2006/14* (2013.01); *C01P 2006/17* (2013.01)
(58) Field of Classification Search
  CPC .............. C01P 2006/12; C01P 2006/14; C01P 2006/17; G02B 5/208
  See application file for complete search history.

(56) References Cited

FOREIGN PATENT DOCUMENTS

| | | | | |
|---|---|---|---|---|
| JP | 2006-8428 A | | 1/2006 | |
| JP | 2006008428 A | * | 1/2006 | ............. C01B 35/18 |

\* cited by examiner

METHOD FOR PRODUCING LANTHANUM HEXABORIDE-CONTAINING COMPOSITE PARTICLES AND METHOD FOR PRODUCING FORMED PRODUCT

TECHNICAL FIELD

The present invention relates to a method for producing lanthanum hexaboride-containing composite particles capable of producing a formed product having sufficiently high transparency and excellent weather resistance, and a method for producing a formed product.

BACKGROUND ART

In recent years, in a formed product of a film, particles of an infrared shielding substance are dispersed. As an infrared shielding substance, for example, lanthanum hexaboride ($LaB_6$) has been known. However, lanthanum hexaboride particles and a formed product having the particles dispersed have drawbacks such that the infrared shielding property decreases when exposed to water vapor or water (that is, they have low water resistance).

Patent Document 1 discloses a method for producing composite particles, in which to a dispersion of lanthanum hexaboride particles, a tetraalkyl silicate and hydrochloric acid or ammonia are added and further water is added to hydrolyze the tetraalkyl silicate to form amorphous silica, which is fixed to the lanthanum hexaboride particles, the formed slurry is washed with water, subjected to filtration, dried at 120° C., calcined at 500° C. and pulverized to obtain composite particles.

Patent Document 2 discloses composite particles comprising lanthanum hexaboride particles surface-treated with a silicone water repellent treatment agent containing a co-hydrolyzed condensate obtained by co-hydrolyzing and condensing a specific amino group-containing alkoxysilane or its partial hydrolysate and a specific bis(alkoxysilyl) group-containing compound or its partial hydrolysate in the presence of an organic acid or inorganic acid.

PRIOR ART DOCUMENTS

Patent Documents

Patent Document 1: JP-A-2004-43764
Patent Document 2: JP-A-2006-8428

DISCLOSURE OF INVENTION

Technical Problem

The present inventors have confirmed that by the method disclosed in Patent Document 1, in order that a coating film formed from fixed amorphous silica has a structure dense enough to prevent water vapor and water from infiltrating, that is, in order to impart sufficient water resistance to the composite particles, calcination at high temperature of at least 500° C. is necessary at the time of producing the composite particles. Further, the obtained composite particles have a particle size of several μm, and a film having such composite particles incorporated therein has a high haze and low transparency. Further, the surface-treated particles are found to have a size to such an extent that filtration operation is possible, since the particles are subjected to filtration. If the particles are pulverized to smaller particles, the specific surface area of the particles increases or the lanthanum hexaboride particles are exposed, whereby the water resistance of the composite particles decreases and the infrared shielding performance of the resulting film may decrease with time.

In the method disclosed in Patent Document 2, the control of the production steps is very complicated. Further, whether a uniform coating is obtained or not is influenced e.g. by the mixing state of the lanthanum hexaboride particles and the silicone water repellent treatment agent, and composite particles excellent in the water resistance may not be obtained.

The object of the present invention is to provide a method for producing lanthanum hexaboride-containing composite particles, by which it is possible to produce lanthanum hexaboride-containing composite particles capable of producing a formed product having sufficiently high transparency, and having excellent weather resistance, by simple operation without calcination at high temperature, and a method for producing a formed product using it.

Solution to Problem

The present invention has the following constitutions.
[1] A method for producing lanthanum hexaboride-containing composite particles, which comprises:
reacting at least one silica precursor selected from the group consisting of a tetraalkoxysilane, its hydrolysate and its condensate, in the presence of lanthanum hexaboride particles, a base having a boiling point of at most 200° C., water and an organic solvent to obtain a first reaction mixture, and reacting the first reaction mixture with at least one silicon compound selected from the group consisting of an amino-modified silicone, an alkylsilane and an aminosilane, or with the silicon compound and the silica precursor added, to obtain a second reaction mixture containing lanthanum hexaboride-containing composite particles.
[2] The production method according to [1], wherein after the second reaction mixture is obtained, the second reaction mixture is dried to recover the lanthanum hexaboride-containing composite particles.
[3] The production method according to [2], wherein the second reaction mixture is a dispersion having the lanthanum hexaboride-containing composite particles dispersed in an organic solvent, and the second reaction mixture is subjected to centrifugal separation, the supernatant is removed and the sediment is recovered, and the sediment is dried.
[4] The production method according to any one of [1] to [3], wherein the first reaction mixture contains the silica precursor which remains unreacted.
[5] The production method according to any one of [1] to [4], wherein the reaction of the silica precursor to obtain the first reaction mixture is carried out in the further presence of zirconium oxide particles.
[6] The production method according to any one of [1] to [5], wherein the tetraalkoxysilane is an alkoxysilane having a $C_{1-4}$ alkoxy group.
[7] The production method according to any one of [1] to [5], wherein the tetraalkoxysilane is tetraethoxysilane.
[8] The production method according to any one of [1] to [7], wherein the silicon compound is an amino-modified silicone.
[9] The production method according to [8], wherein the amino-modified silicone is a side-chain type amino-modified silicone, a dual-end type amino-modified silicone, a single-end type amino-modified silicone or a side-chain dual-end type amino-modified silicone.

[10] The production method according to [8], wherein the amino-modified silicone is a side-chain type amino-modified silicone having an amino group-containing organic group introduced to a part of the side chain of dimethylpolysiloxane.

[11] The production method according to any one of [1] to [10], wherein the base having a boiling point of at most 200° C. is ammonia or a primary to tertiary alkylamine.

[12] The production method according to any one of [1] to [11], wherein the base having a boiling point of at most 200° C. is present in an amount such that pH at the time of the reaction to obtain the first reaction mixture is from 8.0 to 12.0.

[13] The production method according to any one of [1] to [12], wherein the average primary particle size of the lanthanum hexaboride-containing composite particles is from 10 to 1,000 nm.

[14] A method for producing a formed product, which comprises producing lanthanum hexaboride-containing composite particles by the production method as defined in any one of [1] to [13], mixing the lanthanum hexaboride-containing composite particles and a thermoplastic resin to obtain a thermoplastic resin composition, and forming the thermoplastic resin composition to obtain a formed product.

[15] The production method according to [14], wherein the content of the lanthanum hexaboride-containing composite particles is from 0.01 to 1 part by mass per 100 parts by mass of the thermoplastic resin.

[16] The production method according to [14] or [15], wherein the thermoplastic resin is a fluororesin.

Advantageous Effects of Invention

According to the present invention, lanthanum hexaboride-containing composite particles capable of producing a formed product having sufficiently high transparency, and having excellent weather resistance, can be produced by simple operation without calcination at high temperature.

According to the present invention, since the composite particles are produced by the method for producing composite particles of the present invention, a formed product which is excellent in transparency and, weather resistance and of which deterioration of the infrared shielding property with time is suppressed can be formed by simple operation.

DESCRIPTION OF EMBODIMENTS

Meanings of the following terms and manner of description in this specification are as follows.

A compound represented by the formula (1) is referred to as compound (1). The same applies to compounds represented by other formulae.

"Infrared shielding property" means a property to transmit a visible light having a wavelength of from 400 to 700 nm and to block a near infrared light having a wavelength of from 700 to 1,800 nm.

[Method for Producing Lanthanum Hexaboride-Containing Composite Particles]

In the method for producing lanthanum hexaboride-containing composite particles (hereinafter sometimes referred to as simply as composite particles) of the present invention, first, at least one silica precursor selected from the group consisting of a tetraalkoxysilane, its hydrolyzate and its condensate is reacted in the presence of lanthanum hexaboride particles (hereinafter sometimes referred to as $LaB_6$ particles), a base having a boiling point of at most 200° C. (hereinafter sometimes referred to as a volatile base), water and an organic solvent to obtain a first reaction mixture (hereinafter sometimes referred to as primary step).

Then, the first reaction mixture is reacted with at least one silicon compound selected from the group consisting of an amino-modified silicone, an alkylsilane and an aminosilane, or the silicon compound and the silica precursor additionally added, to obtain a second reaction mixture containing composite particles (hereinafter sometimes referred to as secondary step).

After the secondary step, as the case requires, the second reaction mixture is dried to obtain composite particles (hereinafter sometimes referred to as drying step).

The above obtained composite particles comprise $LaB_6$ particles and a silica coating formed on their surface. The silica coating contains an amino group or an alkyl group derived from the silicon compound.

(Primary Step)

The primary step is carried out, for example, by mixing the $LaB_6$ particles, the volatile base, water, the organic solvent and the silica precursor and as the case requires, other components to carry out reaction. The order of mixing is not particularly limited, and it is preferred to add the volatile base and the silica precursor to a dispersion containing the organic solvent, water and the $LaB_6$ particles. In a case where the $LaB_6$ particles is pulverized, it is preferred to pulverize a liquid containing the organic solvent and the $LaB_6$ particles by a known method such as a bead mill, adding water and as the case requires, an additional organic solvent to prepare a dispersion, and adding the volatile base and the silica precursor.

In a case where zirconium oxide particles are used in combination, the zirconium oxide particles are preferably added preliminarily to the dispersion of the $LaB_6$ particles before addition of the silica precursor.

The silica precursor is added as diluted with an organic solvent. The organic solvent may, for example, be an alcohol (such as methanol or ethanol) or a ketone (such as acetone).

The entire amount of the silica precursor used for the primary step may be added all at once, or the silica precursor may be continuously added e.g. by dropping, or may be added dividedly.

The temperature at which the silica precursor is reacted is preferably from 10 to 50° C., particularly preferably from 20 to 40° C. When the temperature is at least the lower limit value of the above range, the reaction rate will not be too low, and it will not take too long until silica precipitates. When the temperature is at most the upper limit value of the above range, the particles in the dispersion are less likely to aggregate.

The reaction time in the primary step is, considering the water resistance of the $LaB_6$ particles, preferably from 20 minutes to 6 hours, particularly preferably from 40 minutes to 2 hours.

When the first reaction mixture contains the silica precursor which remains unreacted, the amino group or the alkyl group derived from the silicon compound is likely to be sufficiently introduced to the silica coating in the secondary step. However, the present invention is not limited to such an embodiment. The first reaction mixture containing no silica precursor which remains unreacted and the silicon compound may be reacted. The first reaction mixture, the silicon compound and an additional silica precursor may be reacted.

To obtain the first reaction mixture containing the silica precursor which remains unreacted, the reaction time in the primary step is adjusted so that the first reaction mixture contains the silica precursor which remains unreacted. Otherwise, the silica precursor may be added to the first reaction mixture in the secondary step. The time such that the first reaction mixture contains the silica precursor which remains unreacted is a time such that a part of the silica precursor used in the primary step is reacted (that is, not the entire amount is reacted).

The reaction time over which a part of the silica precursor is reacted may be estimated from changes of pH of the reaction liquid. The tetraalkoxysilane is first hydrolyzed in the liquid to form a silanol group. Since the silanol group exhibits acidic behavior, the pH of the reaction liquid tends to decrease while the alkoxy group of the tetraalkoxysilane remains and the hydrolysis proceeds.

The first reaction mixture obtained in the primary step typically contains substances formed by the reaction (hydrolysis, polycondensation) of the silica precursor, the $LaB_6$ particles, the volatile base, water, the organic solvent, etc. Further, it may contain the silica precursor which remains unreacted. In a case where other component is used, such other component is also contained in the first reaction mixture. The substance formed by the reaction of the silica precursor is typically silica.

The average primary particle size of the $LaB_6$ particles is preferably from 5 to 1,000 nm, more preferably from 10 to 400 nm, particularly preferably from 20 to 200 nm. When the average primary particle size is at least the lower limit value of the above range, the composite particles are more excellent in the weather resistance. Further, when the primary step is carried out by dispersing the $LaB_6$ particles in a dispersion medium such as water or an alcohol, the $LaB_6$ particles are excellent in dispersion stability, are hardly aggregate and settle without using a dispersing agent, and can be maintained in a stably dispersed state. By not using a dispersing agent, it is possible to prevent an organic substance (dispersing agent) which may cause coloring at the time of forming a formed product containing the composite particles from being contained in the composite particles. When the average primary particle size is at most the upper limit value of the above range, the formed product containing the composite particles is more excellent in transparency and infrared shielding property.

The average primary particle size is an average value of maximum sizes of 10 primary particles of the $LaB_6$ particles measured by a transmission electron microscope.

The volatile base is a catalyst to make the reaction of the silica precursor (hydrolysis of the tetraalkoxysilane or its partial hydrolyzate, condensation of the hydrolyzate, further condensation of the condensate, etc.) proceed and to form silica. Although an acid functions as a catalyst, by the catalyst being a base, as compared with a case where the catalyst is an acid, a highly dense silica coating can be formed. Further, the volatile base volatilizes at the time of drying and is less likely to remain in the composite particles. If the catalyst remains, the composite particles are bound and large particles having a plurality of $LaB_6$ particles incorporated precipitate, whereby the transparency of the formed product may decrease, or the composite particles may be thermally decomposed at the time of melt-kneading with the resin, thus leading to coloring.

The volatile base is preferably a base having a boiling point of at most 200° C., more preferably at most 150° C. It may, for example, be ammonia, a primary to tertiary alkylamine preferably having from 1 to 3 carbon atoms, such as methylamine or dimethylamine, or a cyclic amine such as pyridine, and in view of availability and handling efficiency, it is preferably ammonia.

The amount of the volatile base used in the primary step is preferably an amount such that the pH at the time of the reaction is from 8.0 to 12.0, particularly preferably from 8.5 to 10.5. When the pH is at least the lower limit value of the above range, the reaction rate will not be too low. When the pH is at most the upper limit value of the above range, formation of silica particles not used for covering the lanthanum boride particles can be suppressed, and the composite particles are excellent in the water resistance and a formed product excellent in transparency is formed.

During the reaction in the primary step, it is preferred to appropriately add the volatile base so that the pH is always within the above range. The pH here means a value at the reaction temperature.

Water is used to hydrolyze the silica precursor. The amount of water used in the primary step is such an amount that the proportion of water to the entire amount of the silica precursor used in the primary step as calculated as the tetraalkoxysilane is at least 200 mol %, particularly preferably at least 500 mol %. That is, the amount of water is preferably at least 2 mol, particularly preferably at least 5 mol per 1 mol of the alkoxy group in the alkoxysilane. The upper limit of the amount of water is not particularly limited.

The organic solvent is used to form the dispersion in the primary step. Further, by using the organic solvent, the silane precursor will be favorably dissolved, whereby a uniform silica coating can be formed.

The organic solvent may be one having a boiling point of preferably from 20 to 150° C., such as an alcohol such as ethanol, 2-propanol or tert-butanol or a ketone such as acetone. The amount of the organic solvent used in the primary step is preferably from 40 to 95 mass %, more preferably from 50 to 90 mass %, to the total amount of water and the organic solvent.

The concentration of the $LaB_6$ particles in the primary step is, as the concentration in the reaction liquid (the total amount of the $LaB_6$ particles, the water, the organic solvent, the volatile base and the silica precursor), preferably from 0.1 to 10 mass %, more preferably from 0.5 to 8 mass %, particularly preferably from 1 to 5 mass %. When the concentration is at least 0.1 mass %, sufficiently high productivity will be obtained. When the concentration is at most 10 mass %, the obtainable particles are less likely to aggregate and can easily be handled.

The silica precursor is at least one member selected from the group consisting of a tetraalkoxysilane, its hydrolyzate and its condensate.

The number of carbon atoms of the alkoxy group in the tetraalkoxysilane is typically from 1 to 4, in order that the reaction rate is not too high, it is preferably from 2 to 4, and in view of appropriate reaction rate, it is particularly preferably 2. The larger the number of carbon atoms of the alkoxy group, the lower the reaction rate (hydrolysis rate) tends to be. By the reaction rate of the tetraalkoxysilane being not too high, water resistance (uniformity of the silica coating) will improve, and by the reaction rate being not too low, the productivity of the composite particles will improve.

The four alkoxy groups in the tetraalkoxysilane may be the same or different. The tetraalkoxysilane may, for example, be tetramethoxysilane, tetraethoxysilane, tetra-n-propoxysilane, tetraisopropoxysilane or tetra-n-butoxysilane. They may be used alone or in combination of two or more. Among them, tetraethoxysilane is particularly preferred in view of appropriate reaction rate.

By hydrolyzing the tetraalkoxysilane, at least a part of the alkoxy groups of the tetraalkoxysilane is formed into an OH group to form a hydrolyzate having a silanol group (—Si—OH). The silanol groups are reacted (condensed) to form a condensate having a siloxane bond.

The hydrolyzate of the tetraalkoxysilane may be a partial hydrolyzate in which some of the alkoxy groups are formed into an OH group, or may be silicic acid in which all the alkoxy groups are formed into OH groups.

The hydrolysis and condensation of the tetraalkoxysilane may be conducted by a known method. A method may be mentioned in which the tetraalkoxysilane, water and a catalyst such as the volatile base are mixed and kept at a temperature of from about 10 to about 70° C.

The amount (as calculated as $SiO_2$) of the silica precursor used in the primary step is preferably from 30 to 300 parts by mass, more preferably from 70 to 250 parts by mass, particularly preferably from 100 to 200 parts by mass per 100 parts by mass of the $LaB_6$ particles. When the amount of the silica precursor is at least the lower limit value of the above range, the composite particles will be more excellent in the weather resistance. When the amount of the silica precursor is at most the upper limit value of the above range, the formed product will be more excellent in the transparency.

The entire amount of the silica precursor used for production of the composite particles may be used in the primary step, or a part of the silica precursor used for production of the composite particles may be used in the primary step. In a case where a part of the silica precursor is used in the primary step, the rest is used in the secondary step.

The amount (as calculated as $SiO_2$) of the silica precursor used in the primary step is preferably at least 5 mass %, particularly preferably at least 10 mass % to the total amount (as calculated as $SiO_2$) of the silica precursor used for production of the composite particles. When the amount of the silica precursor is at least the lower limit value of the above range, the composite particles will be more excellent in water resistance.

In a case where the silicon compound used in the secondary step is an amino-modified silicone, the upper limit of the amount (as calculated as $SiO_2$) of the silica precursor used in the primary step to the total amount (as calculated as $SiO_2$) of the silica precursor used for production of the composite particles is not particularly limited and may be 100 mass %.

In a case where the silicon compound used in the secondary step is an alkylsilane or an aminosilane, the amount (as calculated as $SiO_2$) of the silica precursor used in the primary step to the total amount (as calculated as $SiO_2$) of the silica precursor used for production of the composite particles is preferably at most 50 mass % in view of the transparency and water resistance of the formed product.

The total amount (as calculated as $SiO_2$) of the silica precursor used for production of the composite particles is preferably from 30 to 350 parts by mass, more preferably from 70 to 300 parts by mass, particularly preferably from 100 to 250 parts by mass per 100 parts by mass of the $LaB_6$ particles. When the total amount is at least the lower limit value of the above range, the composite particles will be more excellent in weather resistance. When the total amount of the silica precursor is at most the upper limit value of the above range, the proportion of the $LaB_6$ particles in the composite particles is sufficiently high, and it is not so much necessary to increase the amount of the composite particles incorporated in the formed product to obtain sufficient infrared shielding property.

In the primary step, at the time of the reaction of the silica precursor, component other than the $LaB_6$ particles, the volatile base, the water and the organic solvent may further be present. Other component may, for example, be preferably zirconium oxide particles.

The reaction of the silica precursor in the primary step is carried out preferably in the absence of the silicon compound. If the silicon compound is present, the composite particles may be insufficient in the weather resistance.

By the reaction of the silica precursor in the primary step being carried out in the presence of zirconium oxide particles, the composite particles will be more excellent in water resistance. The reason is considered to be such that the zirconium oxide particles aggregate around the $LaB_6$ particles to form a shell, and that since zirconium oxide and silica are highly compatible with each other, the zirconium oxide particles infiltrate into the silica coating at the time of forming the silica coating, whereby a more dense silica coating having high water resistance is formed.

The average primary particle size of the zirconium oxide particles is preferably from 5 to 500 nm, more preferably from 10 to 400 nm, particularly preferably from 20 to 200 nm. When the average primary particle size is at least the lower limit value of the above range, the composite particles will be more excellent in the weather resistance.

When the average primary particle size is at most the upper limit value of the above range, the formed product containing such composite particles will be more excellent in transparency. The method for measuring the average primary particle size is the same as for the $LaB_6$ particles.

The amount of the zirconium oxide particles used in the primary step is preferably from 10 to 200 parts by mass, particularly preferably from 20 to 100 parts by mass per 100 parts by mass of the $LaB_6$ particles. When the amount is at least the lower limit value of the above range, the composite particles will be more excellent in water resistance. When the amount of the zirconium oxide particles is at most the upper limit value of the above range, a formed product containing such composite particles will be more excellent in transparency.

(Secondary Step)

In the secondary step, the first reaction mixture and the silicon compound are reacted, or the first reaction mixture, the silicon compound and the silica precursor added are reacted, to obtain a second reaction mixture containing the composite particles.

The secondary step is carried out, for example, by mixing the reaction mixture with the silicon compound or with the silicon compound and the additional silica precursor, and keeping the mixture for an optional time.

The silicon compound and the additional silica precursor may be respectively mixed with the first reaction mixture as they are, or may be diluted with an organic solvent and then mixed with the first reaction mixture. The organic solvent may, for example, be an alcohol (such as methanol or ethanol) or a ketone (such as acetone).

The silicon compound is at least one type selected from the group consisting of an amino-modified silicone, an alkylsilane and an aminosilane. By the amino group or the alkyl group derived from the silicon compound being incorporated into the silica coating, water vapor or water is less likely to infiltrate into the silica coating, whereby the weather resistance, particularly water resistance of the composite particles will improve.

The amino-modified silicone is a silicone having an amino group-containing organic group.

The amino group-containing organic group may, for example, be a monoamine type organic group such as —$R^1NH_2$ (wherein $R^1$ is an alkylene group) or a diamine type organic group such as —$R^2NHR^3NH_2$ (wherein $R^2$ and $R^3$ are each independently an alkylene group). The number of carbon atoms in the alkylene group as each of $R^1$ to $R^3$ is preferably from 1 to 3.

As the amino-modified silicone, a known amino-modified silicone may be used, such as a side-chain type amino-modified silicone having an amino group-containing organic group in a part of side chains, a dual-end type amino-modified silicone having an amino group-containing organic group at both ends of the main chain, a single-end type amino-modified silicone having an amino group-containing organic group at a single end of the main chain, or a side-chain dual-end type amino-modified silicone having an amino group-containing organic group in a part of side chains and at both ends of the main chain. The main chain in the amino-modified silicone means a polymer chain formed by linkage of at least two [—Si—O—] units, and a side chain means a group bonded to the silicon atom in the [—Si—O—] unit.

$^N$)—The side-chain type amino-modified silicone may, for example, be an amino-modified silicone having an amino group-containing organic group introduced to a part of the side chains of dimethylpolysiloxane. It typically has [—Si(CH$_3$)$_2$—O—] units and [—Si(CH$_3$)(RO—] units (wherein RN is an amino group-containing organic group).

The dual-end type amino-modified silicone may, for example, be an amino-modified silicone having an amino group-containing organic group introduced to both ends of the main chain of dimethylpolysiloxane.

The single-end type amino-modified silicone may, for example, be an amino-modified silicone having an amino group-containing organic group introduced into a single end of the main chain of dimethylpolysiloxane.

The side-chain dual-end type amino-modified silicone may, for example, be an amino-modified silicone having an amino group-containing organic group introduced to a part of side chains and both ends of the main chain of dimethylsiloxane.

Such an amino-modified silicone may further have an organic group other than the methyl group and the amino group-containing organic group. In a case where it has other organic group, such other organic group may be present in a part of side chains or at the end of the main chain of the amino-modified silicone.

Other organic group which may be present at a part of side chains may, for example, be a polyether group or a phenyl group. Other organic group which may be present at the end of the main chain may, for example, be an alkoxy group such as a methoxy group.

An alkylsilane is a silane compound having an alkyl group and a hydrolyzable group directly bonded to the silicone atom. The hydrolyzable group is preferably a $C_{1-4}$ alkoxy group in view of excellent reactivity.

The alkylsilane is preferably the following compound (1).

$$R^4{}_{4-m}\text{—Si(OR}^5)_m \tag{1}$$

wherein $R^4$ is a $C_{1-8}$ alkyl group, $R^5$ is a methyl group, and m is an integer of from 1 to 3.

By the alkylsilane having $R^4$, as compared with a case where the alkylsilane does not have $R^4$ (for example, in a case where $R^4$ is $OR^5$), the resulting formed product containing the composite particles is more excellent in transparency, and the composite particles are more excellent in water resistance. When the number of carbon atoms of $R^4$ is at most the upper limit value of the above range, a formed product containing the composite particles is more excellent in transparency. By $R^5$ being a methyl group, as compared with a case where $R^5$ is an alkyl group having at least 2 carbon atoms, excellent reactivity with the silanol group is obtained.

The alkyl group as $R^4$ may be linear or branched, and is preferably a $C_{1-4}$ alkyl group. In a case where m is 1 or 2, (4-m) $R^4$'s may be the same or different. m is preferably 3.

The compound (1) may, for example, be methyltrimethoxysilane, ethyltrimethoxysilane, n-propyltrimethoxysilane, isobutyltrimethoxysilane, n-hexyltrimethoxysilane, dimethyldimethoxysilane, diisopropyldimethoxysilane, diisobutyldimethoxysilane, trimethylmethoxysilane, propyldimethylmethoxysilane or octyldimethylmethoxysilane. It is particularly preferably methyltrimethoxysilane.

An aminosilane is a silane having an amino group and a hydrolyzable group directly bonded to the silicon atom. The hydrolyzable group is preferably a $C_{1-4}$ alkoxy group in view of excellent reactivity.

The aminosilane is preferably the following compound (2):

$$R^6{}_{4-p-q}\text{—Si(OR}^7)_p(R^8)_q \tag{2}$$

wherein $R^6$ is —$R^1NH_2$ or —$R^2NHR^3NH_2$, $R^7$ is a methyl group, $R^8$ is a $C_{1-8}$ alkyl group, p is an integer of from 1 to 3, q is an integer of from 0 to 2, p+q is an integer of from 1 to 3, and $R^1$ to $R^3$ are as defined above.

The compound (2) may, for example, be 3-aminopropyltrimethoxysilane, N-2-(aminoethyl)-3-aminopropyltrimethoxysilane or N-2-(aminoethyl)-3-aminopropylmethyldimethoxysilane.

Such a silicon compound may be used alone or in combination of two or more.

The silicon compound is particularly preferably an amino-modified silicone. When the silicon compound is an amino-modified silicone, the formed product will be more excellent in transparency. Further, when a dispersion having the composite particles dispersed in water is obtained as the second reaction mixture, and the dispersion is subjected to centrifugal separation in the drying step, the composite particles are likely to settle, and excellent efficiency for recovery of the composite particles from the dispersion is obtained.

The amino-modified silicone is particularly preferably a side-chain type amino-modified silicone having —R¹NH₂ in a part of side chains.

The amount (as calculated as solid content) of the silicon compound used in the secondary step is preferably from 0.01 to 100 parts by mass, more preferably from 0.02 to 80 parts by mass, particularly preferably from 0.03 to 50 parts by mass per 100 parts by mass of the total amount (as calculated as $SiO_2$) of the silica precursor used for production of the composite particles. When the amount of the silicon compound is at least the lower limit value of the above range, the composite particles will be more excellent in the weather resistance. When the amount of the silicon compound is at most the upper limit value of the above range, more excellent infrared shielding property per mass of the composite particles will be achieved.

Preferred ranges of the pH and the temperature at the time of the reaction in the secondary step are respectively the same as those in the primary step. It is preferred to appropriately add the volatile base so that the pH is always within the above range during the reaction in the secondary step. The reaction in the secondary step is carried out preferably until the pH change per hour becomes at most 0.02.

The second reaction mixture obtained in the secondary step contains composite particles. It typically contains the volatile base, the water and the organic solvent. Further, it may contain the silica precursor and the silicon compound which remain unreacted, substances formed by their reaction, not incorporated into the composite particles, etc. In a case where other component is used, such other component is also contained in the second reaction mixture.

The second reaction mixture may be used e.g. for production of a formed product as it is, however, it is preferably dried to recover the composite particles.

(Drying step) The method in the drying step may, for example, be a method of drying the entire amount of the second reaction mixture as it is, or a method of concentrating the solid content from the second reaction mixture to obtain a concentrate, and drying the concentrate.

The drying temperature is preferably from 60 to 200° C., particularly preferably from 60 to 150° C. When the drying temperature is at least the lower limit value of the above range, a decrease of the handling efficiency by insufficient drying is suppressed. Further, the amount of the residue is small, and coloring or bubbling due to e.g. heat decomposition of the residue in the formed product is suppressed. When the drying temperature is at most the upper limit value of the above range, the amino group or the alkyl group derived from the silicon compound is less likely to disappear. Further, bonding of silanol groups remaining in the composite particles can be suppressed.

As a method of concentrating the solid content from the second reaction mixture to obtain a concentrate and then drying the concentrate, preferred is a method of removing non-precipitated components from the second reaction mixture to recover the sediment, and drying the sediment. The sediment is a component which can settle when the second reaction mixture is left at rest or subjected to a treatment such as centrifugal separation. The non-precipitated components are components other than the sediment.

In the second reaction mixture, as the non-precipitated components, a hydrolyzate/condensate (silica sol) of the tetraalkoxysilane or the silicon compound not incorporated into the silica coating may remain. If the second reaction mixture containing such components is entirely dried as it is or if its solid content is concentrated and the concentrate is dried, such components may deposit on the composite particles at the time of drying and function as a binder to bind the composite particles thereby to form aggregated composite particles. Aggregated composite particles may cause large particles (appearance defects) which can be visually confirmed in the formed product. Accordingly, it is preferred to remove the non-precipitated components.

As a method of removing the non-precipitated components from the second reaction mixture to recover the sediment, centrifugal separation or decantation may, for example, be mentioned, and centrifugal separation is preferred in view of reduction of drying energy by high concentration recovery of the sediment.

The conditions for the centrifugal separation treatment may be optionally set and are not particularly limited, and for example, the centrifugal separation may be conducted at from 10 to 40° C. at from 2,000 to 4,000 G for from 2 to 5 minutes.

The powder obtained by drying is usually aggregates having a plurality of composite particles aggregated. After drying, the obtained powder may be shredded.

The shredding method is not particularly limited and may be carried out by a known apparatus commonly used for shredding or pulverization of a powder. A pulverizer such as a mixer with a blade, a rocking mixer of a type such that only a container itself rotates without a blade, or a jet mill may be used. Otherwise, a method may be employed in which the powder is put in a plastic bag, and aggregates of several mm are crushed with fingers.

The shredding conditions are properly set depending upon the apparatus used and for example, a treatment by a waring blender for 10 seconds may be mentioned.

The powder obtained by drying may be subjected to surface treatment with a hydrophobic treatment agent, as the case requires. The surface of the composite particles becomes more hydrophobic, and when the composite particles and a thermoplastic resin are mixed to form a thermoplastic resin composition, or when the thermoplastic resin composition is formed to obtain a formed product, the composite particles are less likely to aggregate, and the formed product tends to have higher transparency. Further, when the thermoplastic resin is formed by an extruder, the thermoplastic resin is less likely to stay in the extruder, and foreign matters in the formed product can be reduced.

Among the silicon compounds used in the secondary step, the alkylsilane corresponds to a hydrophobic treatment agent, however, the secondary step and the surface treatment of the powder obtained by drying differ from each other in that the former is carried out in the presence of water, an organic solvent, etc., and the latter is conducted on particles in a dry state.

The hydrophobic treatment agent may, for example, be a silane coupling agent having a hydrophobic organic group or an organosilicone compound having a hydrophobic organic group (such as a silicone oil). The hydrophobic treatment agent preferably contains no reactive functional group such as an epoxy group or an amino group nor hydrophilic group.

The hydrophobic organic group may, for example, be an alkyl group, an alkenyl group, an aryl group, an aralkyl group, a fluoroalkyl group or a fluoroaryl group. Among them, preferred is a $C_{1-20}$ alkyl group, a $C_{1-20}$ fluoroalkyl group having a fluorine atom, a phenyl group which may be substituted by an alkyl group or a fluoroalkyl group, or the like.

The silane coupling agent may, for example, be methyltrimethoxysilane, ethyltrimethoxysilane, isobutyltrimethoxysilane, hexyltrimethoxysilane, (3,3,3-trifluoropropyl)trimethoxysilane or ethyltriethoxysilane.

The silicone oil may, for example, be dimethyl silicone oil, methyl hydrogen silicone oil or phenyl methyl silicone oil.

The hydrophobic treatment agent is preferably at least one member selected from the group consisting of isobutyltrimethoxysilane, hexyltrimethoxysilane, ethyltriethoxysilane, dimethyl silicone oil and phenyl methyl silicone. They have high reactivity with the silica coating and can make the surface of the silica coating hydrophobic with a small amount.

The amount of the hydrophobic treatment agent is properly selected depending upon the specific surface area of the powder, the reactivity of the powder and the hydrophobic treatment agent, etc. The amount of the hydrophobic treatment agent is preferably from 1 to 50 parts by mass, more preferably from 3 to 20 parts by mass, particularly preferably from 5 to 10 parts by mass per 100 parts by mass of the powder. When the amount of the hydrophobic treatment agent is within the above range, the composite particles are less likely to aggregate, and the outer appearance of the formed product is less likely to deteriorate.

The method of treating on the powder with the hydrophobic treatment agent is not particularly limited, and preferred is a method of dispersing the powder in a solution having the hydrophobic treatment agent dissolved in water, an alcohol, acetone, n-hexane, toluene or the like, followed by drying.

After the drying, the obtained powder may be calcined. The calcination temperature is preferably from 230 to 300° C. The calcination time is preferably from 1 to 24 hours, particularly preferably from 1 to 10 hours. The calcination atmosphere may be the air or a reducing atmosphere such as nitrogen.

The thickness of the silica coating in the composite particles is preferably from 2 to 50 nm, particularly preferably from 5 to 30 nm. When the thickness is at least the lower limit value of the above range, the composite particles are more excellent in the weather resistance (water resistance, etc.). When the thickness is at most the upper limit value of the above range, the proportion of the silica coating to the $LaB_6$ particles will not be too high, and it is not so much necessary to increase the amount of the composite particles to be incorporated into the formed product so as to obtain sufficient infrared shielding property. When the amount of the composite particles is suppressed, the forming property and the transparency of the formed product will improve. The thickness of the silica coating is measured by a transmission electron microscope.

The mass ratio of the $LaB_6$ particles to the amount of the silica coating as calculated as $SiO_2$ in the composite particles is preferably from 10:2 to 10:50, particularly preferably from 10:5 to 10:20. The higher the ratio in the above range, the more excellent the weather resistance tends to be. The lower the ratio within the above range, the more excellent the infrared shielding performance of the composite particles per unit mass and the transparency.

The mass ratio can be calculated from the amounts of the $LaB_6$ particles and the silica precursor used in the primary step and the amount of the silicon compound and optional silica precursor used in the secondary step.

The average primary particle size of the composite particles is preferably from 10 to 1,000 nm, more preferably from 20 to 500 nm, particularly preferably from 20 to 200 nm. When the average primary particle size is at most the upper limit value of the above range, the formed product is more excellent in transparency.

The average of maximum particle sizes of 10 particles covered with the silica coating as observed by a transmission electron microscope is taken as the average primary particle size of the composite particles.

The composite particles preferably have a peak at from 5 to 10 nm in a pore size distribution curve measured by nitrogen adsorption method. By having such a peak means that the silica coating is a film constituted by a plurality of silica fine particles aligned on the surface of the $LaB_6$ particles, and fine pores are formed between a plurality of silica fine particles.

The BET specific surface area of the composite particles is preferably from 10 to 50 $m^2/g$, particularly preferably from 10 to 30 $m^2/g$. When the BET specific surface area is at least the lower limit value of the above range, excellent water resistance is obtained. When the BET specific surface are is at most the upper limit value of the above range, excellent infrared shielding performance is obtained.

The BET specific surface area is measured by nitrogen gas adsorption method by a BET specific surface area measuring apparatus.

The pore volume of the composite particles is preferably from 0.01 to 0.15 mL/g, particularly preferably from 0.01 to 0.10 mL/g. When the pore volume is at least the lower limit value of the above range, the composite particles have favorable dispersibility in the film and excellent transparency. When the pore volume is at most the upper limit value of the above range, excellent water resistance is obtained.

The pore volume is measured by nitrogen gas adsorption method.

According to the method for producing the composite particles of the present invention, the composite particles can be obtained, as described above, by conducting the primary step and the secondary step and as the case requires, post-treatment such as drying, shredding, surface treatment with a hydrophobic treatment agent or calcination. In the present invention, the composite particles are considered to be formed as follows.

In the primary step, by the volatile base and water, hydrolysis and condensation reaction of the silica precursor proceed to form silica, the silica is precipitated in the dispersion to form silica fine particles, the silica fine particles are fixed to the surface of the $LaB_6$ particles or the zirconium oxide particles fixed on the surface of the $LaB_6$ particles, to form a silica coating. By carrying out the primary step before the secondary step, the bonding strength between the surface of the $LaB_6$ particles and the silica coating is increased, and leaving of the silica coating by physical force can be prevented.

In the secondary step, in a case where the silicon compound is an amino-modified silicone, the silica fine particles contained in the first reaction mixture are fixed on the surface of the $LaB_6$ particles having the silica coating formed thereon in the primary step, while incorporating the silicon compound, to form the silica coating containing the amino group derived from the silicon compound. In a case where the silicon compound is an alkylsilane or an aminosilane, the silicon compound is also hydrolyzed and reacts with the silica fine particles contained in the first reaction mixture, the alkyl group or the amino group derived from the silicon compound is introduced in the silica fine particles, and the silica fine particles are fixed on the surface of the $LaB_6$ particles having the silica coating formed thereon in the primary step to form a silica coating containing the alkyl group or the amino group.

Particularly, in a case where the silica precursor is contained in the first reaction mixture or in a case where the silica precursor is added in the secondary step, the reaction of the silica precursor proceeds by the volatile base and water (which may be added as the case requires) which have already been present in the first reaction mixture. On that occasion, in a case where the silicon compound is an amino-modified silicone, not only the silica fine particles formed in the secondary step are fixed on the surface of the $LaB_6$ particles while incorporating the silicon compound, but also the silicon compound fills spaces between the silica fine particles to form the silica coating together with the silica fine particles.

According to the most preferred embodiment of the secondary step of the present invention, the silica precursor is contained in the first reaction mixture, or the silica precursor is added in the secondary step and the silicon compound is an amino-modified silicone.

The alkylsilane or the aminosilane has low reactivity with the silanol group in the silica coating covering the surface of the $LaB_6$ particles due to steric hindrance of the alkyl group or the amino group, and no strong bonding between particles will occur.

The $LaB_6$ particles tend to have a larger surface area as the particle size becomes smaller, and thereby tend to be inferior in the weather resistance by the influence of e.g. moisture. However, the composite particles obtained by the present invention are excellent in the weather resistance even in the state of fine particles (for example, particle size of at most 100 nm) which can sufficiently maintain transparency of the formed product.

The reason why the above effects are obtained is considered to be as follows.

When the silica coating is formed so as to bond a plurality of primary particles of lanthanum hexaboride, the composite particles have a large particle size, for example, 1,000 nm or larger. If composite particles having such a particle size are blended as they are for a formed product, the transparency of the formed product will be impaired. Further, uniform dispersibility into the film inside tends to be inferior, and the infrared shielding performance will decrease. If the composite particles are pulverized to decrease the particle size, the silica coating may be broken or may be missed, or a part of the $LaB_6$ particles may be exposed, whereby the $LaB_6$ particles are likely to be influenced by moisture, components derived from the thermoplastic resin (for example, hydrofluoric acid formed from a fluororesin), and the weather resistance tends to be insufficient.

In the present invention, composite particles having such a structure that a silica coating is formed on the surface of each of the primary particles of the $LaB_6$ particles, and the silica coating is formed around one $LaB_6$ particle, are likely to be formed. The composite particles formed in such a manner, in which the silica coating contains an amino group or an alkyl group derived from the silicon compound, are hardly calcined at the time of drying and thereby have small aggregation force, and can be easily shredded even when aggregate, and breakage or missing of the silica coating hardly occurs. Accordingly, a protective effect by a silica coating is sufficiently exhibited, and excellent weather resistance is obtained. Further, the composite particles obtained by the present invention have small aggregation force between particles and are excellent in dispersability, and accordingly aggregates of the composite particles are less likely to form at the time of kneading with the thermoplastic resin and forming, and a decrease of transparency (an increase of the haze) by the aggregates is less likely to occur.

The above effects is particularly excellent when the silicon compound is an amino-modified silicone. This is considered to be because when the amino-modified silicone is incorporated in the silica coating in the secondary step, the amino-modified silicone is aligned so that its amino group side faces toward the silica coating film side formed in the primary step, whereby the hydrophobic group such as the methyl group of the amino-modified silicone faces toward the outside of the composite particles, hydrophobicity of the surface increases, and the dispersability more increases.

Further, in a case where the silicon compound is an amino-modified silicone, there is such an advantage that when the dispersion of the composite particles is subjected to centrifugal separation, the composite particles are likely to settle, and excellent efficiency for recovery of the composite particles from the dispersion is obtained.

Further, when the reaction of the silica precursor to obtain the first reaction mixture is carried out in the further presence of zirconium oxide particles, the zirconium oxide particles aggregate on the periphery of the $LaB_6$ particles, and the silica particles cover the periphery thereof, whereby a silica coating more excellent in water resistance can be formed.

[Method for Producing Formed Product]

According to the method for producing a formed product of the present invention, composite particles are produced by the above method for producing composite particles, and the obtained composite particles and a thermoplastic resin are mixed to obtain a thermoplastic resin composition, which is formed to obtain a formed product comprising the composite particles and the thermoplastic resin.

The thermoplastic resin may, for example, be a fluororesin, polyethylene, polypropylene, polyester, polyvinyl chloride, polyamide or polycarbonate. In view of excellent weather resistance, chemical resistance and the like of the formed product, a fluororesin is preferred.

The fluororesin may, for example, be an ethylene/tetrafluoroethylene copolymer (ETFE), a hexafluoropropylene/tetrafluoroethylene copolymer (FEP), a tetrafluoroethylene/propylene copolymer, a tetrafluoroethylene/hexafluoropropylene/propylene copolymer, a perfluoro(alkyl vinyl ether)/tetrafluoroethylene copolymer (PFA), a tetrafluoroethylene/hexafluoropropylene/vinylidene fluoride copolymer (THV), polyvinylidene fluoride (PVDF), a vinylidene fluoride/hexafluoropropylene copolymer, polyvinyl fluoride, a chlorotrifluoroethylene copolymer, an ethylene/chlorotrifluoroethylene copolymer (ECTFE) or polytetrafluoroethylene. They may be used alone or in combination of two or more.

The fluororesin is preferably at least one member selected from the group consisting of ETFE, FEP, PFA, PVDF, ECTFE and THV, particularly preferably ETFE in view of transparency, processability and weather resistance.

The content of the composite particles is properly set depending upon the infrared shielding property required for the formed product, the thickness of the formed product, etc. It is preferably from 0.01 to 1 part by mass, particularly preferably from 0.05 to 0.5 part by mass per 100 parts by mass of the thermoplastic resin. When the content is at least the lower limit value of the above range, the formed product is more excellent in the infrared shielding property. When the content is at most the upper limit value of the above range, the visible light transmittance is more excellent.

The thermoplastic resin composition may contain a known additive. The additive may, for example, be an inorganic pigment or a dye for adjusting the tint, talc for improving the abrasion resistance, an ultraviolet absorber, a photostabilizer, an antioxidant or a flame retardant.

In a case where an additive is contained, its content is preferably from 0.1 to 40 parts by mass, particularly preferably from 0.1 to 20 parts by mass per 100 parts by mass of the thermoplastic resin.

The method of mixing the composite particles and the thermoplastic resin is not particularly limited, and a known method such as kneading or dry blending of powder may be mentioned.

In a case where the thermoplastic resin is melt-formable, melt kneading is preferred. "Melt-formable" means having melt flowability. Melt kneading may be carried out by a known extruder such as a single screw extruder or a twin screw extruder. A kneaded product (thermoplastic resin composition) obtained by melt-kneading may be formed as it is or may be formed after pelletized.

As a method of forming the thermoplastic resin composition, a known forming method such as injection molding, extrusion, co-extrusion, blow molding, compression molding, blown-film extrusion, transfer molding or calendaring may be employed, depending upon the formed product to be produced.

The shape of the formed product is not particularly limited, and the formed product may have any shape depending upon application, such as a film or sheet shape, or a tube shape.

After forming, the obtained formed product may be subjected to surface treatment such as corona discharge treatment, coating with an anti-stick agent, printing to impart a design.

The average primary particle size of the composite particles contained in the formed product obtained by the present invention is preferably from 10 to 1,000 nm, particularly preferably from 20 to 200 nm. When the average primary particle size is at least the lower limit value of the above range, the weather resistance is more excellent, and the infrared shielding property is less likely to deteriorate. When the average primary particle size is at most the upper limit value of the above range, the formed product is more excellent in transparency and infrared shielding property.

In a case where the formed product is a film or a sheet, the thickness of the formed product is typically within a range of from 100 to 3,000 µm. In this specification, one having a thickness of at most 1,000 µm will be referred to as a film, and one having a thickness of more than 1,000 µm will be referred to as a sheet. A film and a sheet may sometimes generally be referred to as "a film or the like".

EXAMPLES

Now, the present invention will be described in further detail with reference to Examples. However, the present invention is by no means restricted to the following Examples. Among the after-described Ex. 1 to 11, Ex. 1 to 8 and 12 are Examples of the present invention, and Ex. 9 to 11 are Comparative Examples.

[Evaluation Methods]
(Pore Size Distribution Curve, BET Specific Surface Area and Pore Volume)

Measurement of the pore size distribution curve, the BET specific surface area and the pore volume of the particles was carried out by using a sample obtained by vacuum-drying the particles at 230° C. to completely remove moisture, by Micrometrics Automatic Surface Area and Porosimeter Analyzer TriStar II.

The position (nm) of a peak which the pore size distribution curve has represents the pore size.

(Average Primary Particle Size)

As the average primary particle size of the particles in the dispersion, a sample obtained by drying the dispersion at 100° C. for 2 hours was observed by a transmission electron microscope, and the particle sizes of particles which looked primary particles in the particles which looked aggregated, were employed. The average primary particle size of the particles contained in the film or the like was measured by observing the cross section of the film or the like by a scanning electron microscope. The average primary particle size is an average of 10 particles.

(Thickness of Silica Coating)

The thickness of the silica coating in the composite particles was obtained by observation with a transmission electron microscope.

(Thickness of Film or the Like)

The thickness of the film or the like was measured by a micrometer.

(Haze)

The haze of the film or the like was measured by a haze meter (manufactured by NIPPON DENSHOKU INDUSTRIES CO., LTD., apparatus name: NDH-5000).

(Appearance Defects in Film or the Like)

The outer appearance of the film or the like was visually observed, and whether large particles (appearance defects) which could be visually confirmed were present or not in the film or the like.

(Visible light transmittance, solar transmittance) The visible light transmittance and the solar transmittance of the film or the like were measured in accordance with an ultraviolet/visible/near infrared (UV-VIS-NIR) spectrophotometer (manufactured by Shimadzu Corporation, apparatus name: UV-3600) in accordance with JIS R3106: 1998.

A film having a difference between the visible light transmittance (%) and the solar transmittance (%) (the visible light transmittance (%)–solar transmittance (%)) of at least 15%, can be considered as an infrared shielding film or the like which transmits visible light and which blocks infrared rays.

(Weather Resistance)

Assuming practical use outdoors, to evaluate durability to both humidity and ultraviolet light, the film or the like was subjected to weathering test using an accelerated weathering testing machine (manufactured by Suga Test Instruments Co., Ltd., apparatus name: Eye Super UV Tester). In the weathering test, a cycle of making dew condensation occur at 63° C. for 2 hours and then applying ultraviolet light at 1,600 W/m² for 10 hours is repeated to a total time of 1,008 hours.

After the weathering test, the haze, the visible light transmittance and the solar transmittance were measured.

The difference between the solar transmittance (%) immediately after production (initial) and the solar transmittance (%) after the weathering test (solar transmittance (%) after the weathering test–initial solar transmittance (%)) (hereinafter sometimes referred to as "Δ solar transmittance") was calculated.

In this evaluation, when a film or the like having an initial solar transmittance of from 30 to 50% has Δ solar transmittance after the weathering test for 1,008 hours within 7%, such a film was evaluated to be excellent in the weather resistance.

Ex. 1

(Production of Composite Particles)

Figure 1:
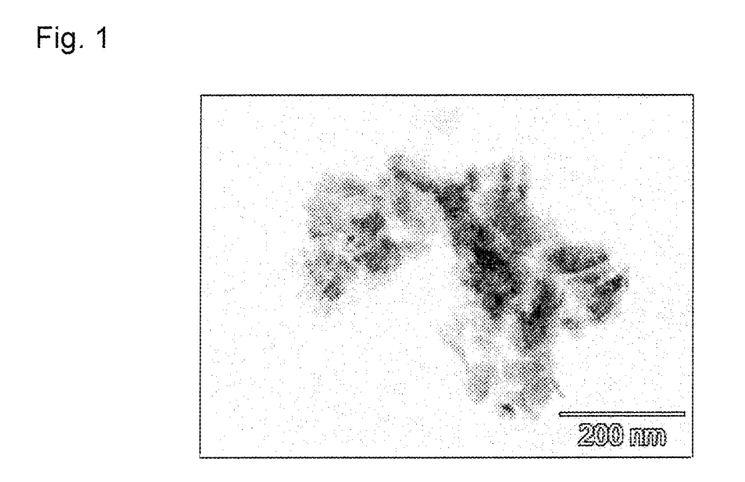
FIG. 1 is a transmission electron microscopic image of $LaB_6$ particles contained in the liquid (1) dispersion in Ex. 1.
Figure 2:
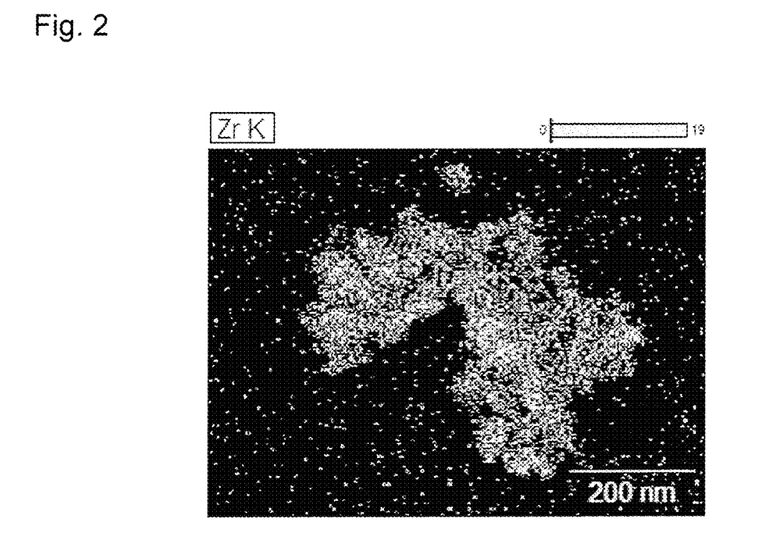
FIG. 2 is an image illustrating distribution of Zr obtained by element mapping of $LaB_6$ particles contained in the dispersion in Ex. 1.
Figure 3:
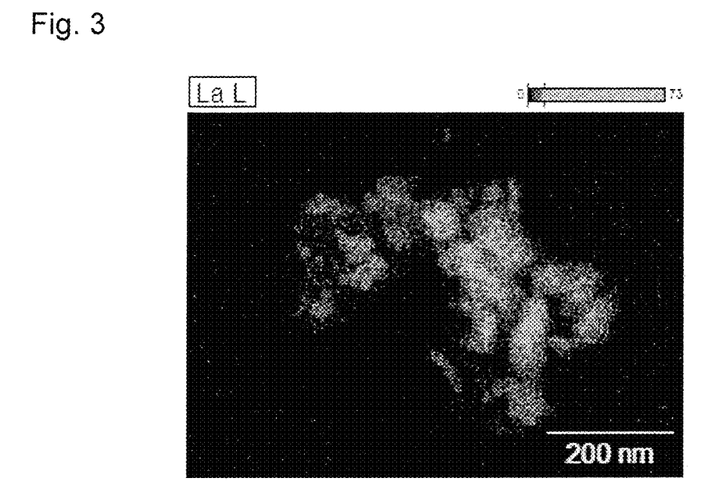
FIG. 3 is an image illustrating distribution of La obtained by element mapping of $LaB_6$ particles contained in the dispersion in Ex. 1.

A dispersion having 120 g of $LaB_6$ particles (lanthanum boride powder manufactured by JAPAN NEW METALS CO., LTD.), 119 g of zirconium oxide particles (zirconia powder manufactured by TOSOH CORPORATION) and 761 g of 2-propanol (manufactured by KANTO CHEMICAL CO., INC.) mixed was pulverized by a bead mill (Ultra Apex Mill manufactured by HIROSHIMA METAL & MACHINERY CO., LTD.) to obtain liquid (1) ($LaB_6$ particles: 12 mass %, zirconium oxide particles: 11.9 mass %, solid content: 23.9 mass %). In the liquid (1), the average primary particle size of the $LaB_6$ particles was 70 nm, the average primary particle size of the zirconium oxide particles was 70 nm. In FIG. 1 is shown a transmission electron microscopic image of the obtained $LaB_6$ particles. In FIG. 2 is shown distribution of Zr obtained by element mapping. In FIG. 3 is shown distribution of La obtained by element mapping.

Then, 445 g of water and 844 g of 2-propanol were mixed, and 250 g of the liquid (1) was added to obtain liquid (2) (lanthanum hexaboride: 17.8 mass %, zirconium oxide: 17.7 mass %, solid content: 35.5 mass %, proportion of 2-propanol to the total amount of water and 2-propanol: 69.5 mass %).

Then, the liquid (2) was adjusted at 35° C., and aqueous ammonia (manufactured by KANTO CHEMICAL CO., INC.) was added to adjust the pH at 9.7. 137.5 g of tetraethoxysilane (TEOS) was added thereto with stirring, followed by stirring for one hour, to obtain a first reaction mixture. To the first reaction mixture, 9.6 g of an amino-modified silicone oil (KF-868, manufactured by Shin-Etsu Chemical Co., Ltd., side-chain type amino-modified silicone) was added. While stirring of the reaction liquid was continued, reaction was carried out for 7 hours while aqueous ammonia was added so that the pH of the reaction liquid would be within a range of from 9.3 to 9.7 to obtain a slurry of composite particles (second reaction mixture).

The slurry was subjected to centrifugal separation by a centrifuge at 3,000 G for 3 minutes. As a result, the slurry was separated into a blackish green viscous sediment and a transparent supernatant. The sediment was deposited on the bottom of the sample tube, and the supernatant could be entirely separated by tilting the sample tube.

Then, the sediment was dried by a vacuum dryer at 120° C. to obtain a powder. The mass of the powder immediately after drying was 108 g, and the yield relative to the theoretical amount (g) obtained calculated from charged amounts was 99 mass %. The theoretical amount obtained was calculated in accordance with the formula (total mass (g) of solid content of liquid (1))×(solid content concentration (mass %) of liquid (1)/100)+(amount (g) of charged TEOS×0.288)+(amount (g) of charged amino-modified silicone).

The powder after drying was pulverized by a waring blender for 20 seconds to obtain composite particles. The thickness of the silica coating in the composite particles was 15 nm.

The obtained composite particles were subjected to measurement by nitrogen adsorption method, whereupon a pore size distribution curve having peaks at 8.1 nm, 10.5 nm and 36.9 nm was obtained. The peak at 36.9 nm was broad and widened in a further broad region, and is thereby considered to indicate spaces between particles. The peaks at 8.1 nm and 10.5 nm are very sharp and are thereby considered to indicate presence of the silica coating.

Figure 4:
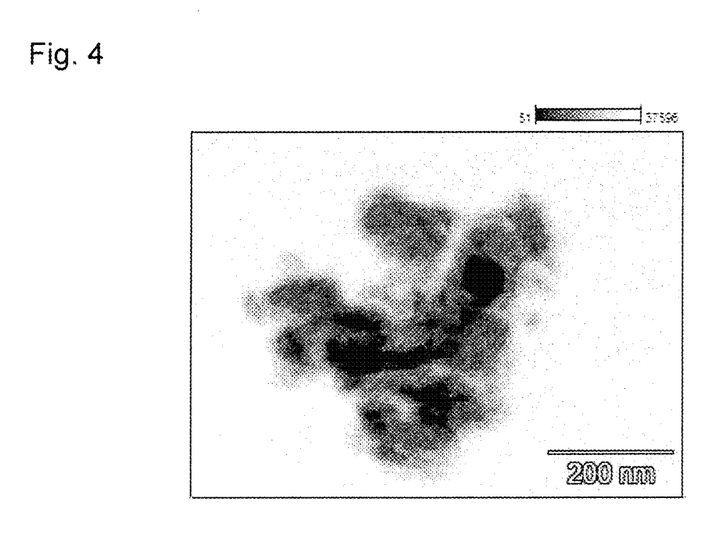
FIG. 4 is a transmission electron microscopic image of composite particles obtained in Ex. 1.
Figure 5:
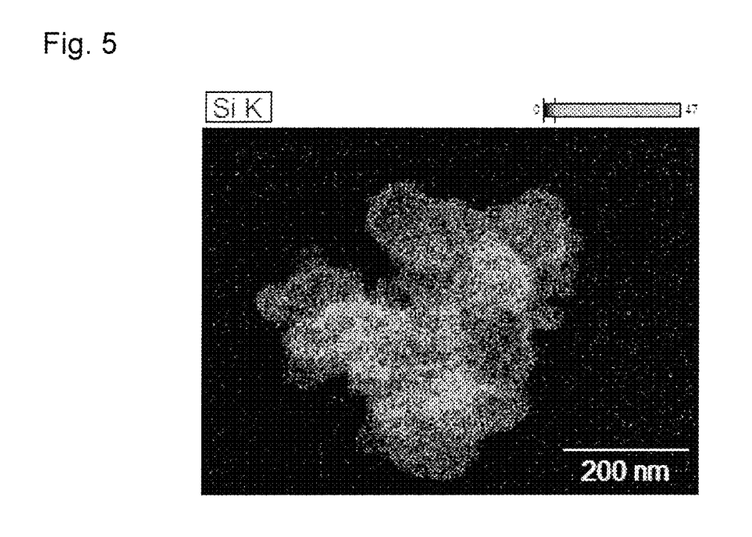
FIG. 5 is an image illustrating distribution of Si obtained by element mapping of composite particles obtained in Ex. 1.
Figure 6:
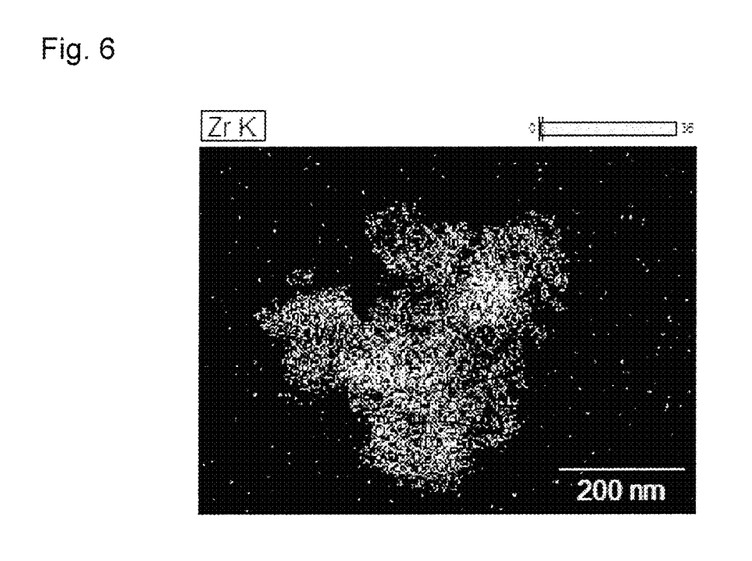
FIG. 6 is an image illustrating distribution of Zr obtained by element mapping of composite particles obtained in Ex. 1.
Figure 7:
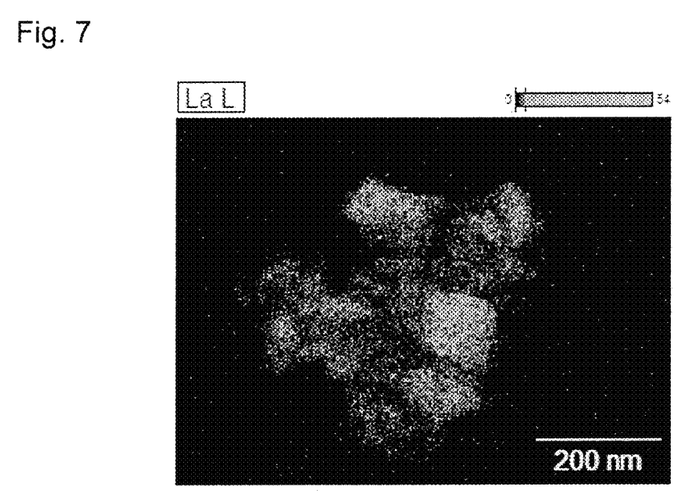
FIG. 7 is an image illustrating distribution of La obtained by element mapping of composite particles obtained in Ex. 1.

In FIG. 4 is shown a transmission electron microscopic image of the composite particles. In FIG. 5 is shown distribution of Si obtained by element mapping. In FIG. 6 is shown distribution of Zr obtained by element mapping. In FIG. 7 is shown distribution of La obtained by element mapping.

(Production of Film)

ETFE (manufactured by Asahi Glass Company, Limited, Fluon ETFE88AXB) and the composite particles were dry-blended in the mass ratio as identified in Table 2 and melt-kneaded and extruded by a twin screw extruder at 300° C. to obtain pellets. The pellets were extruded by a single screw extruder to the outlet of which a T-die was connected at 300° C. to obtain a film having a thickness of 250 µm.

Ex. 2

The composite particles obtained in Ex. 1 were further calcined at 300° C. for 2 hours to obtain composite particles. A film was produced in the same manner as in Ex. 1 except that the obtained composite particles were used and the mass ratio of the composite particles to ETFE was changed as identified in Table 2. The obtained composite particles had a pore size distribution curve having peaks at 8.1 nm and 10.5 nm.

Ex. 3

Composite particles and a film were produced in the same manner as in Ex. 1 except that the drying temperature was 70° C.

Ex. 4

30 g of the composite particles obtained in Ex. 3 were dispersed in 200 g of a 1 mass % toluene solution of phenyl methyl silicone, and toluene was removed by evaporation at 140° C. to obtain 32 g of composite particles surface-treated with phenyl methyl silicone. A film was produced in the same manner as in Ex. 1 using the obtained composite particles.

Ex. 5

Composite particles were obtained in the same manner as in Ex. 1 except that the slurry was dried by a vacuum drier at 120° C. as it was without centrifugal separation. A film was produced in the same manner as in Ex. 1 except that the obtained composite particles were used and the mass ratio of the composite particles to ETFE was changed as identified in Table 2.

In this Ex., a small amount of white foreign substances were observed on the upper side of the powder after drying. After pulverization, the white foreign substances were not visually confirmed, however, after film formation, from 5 to 20 visually recognizable particles (appearance defects) were present in the film per 1 $m^2$.

Ex. 6 to 7

Composite particles were obtained in the same manner as in Ex. 1 except that the amounts of TEOS and the amino-modified silicone charged were changed as identified in Table 1. A film was produced in the same manner as in Ex. 1 except that the obtained composite particles were used and the mass ratio of the composite particles to ETFE was as identified in Table 2. The composite particles obtained in Ex. 6 had a pore size distribution curve having peaks at 1.7 nm, 2 nm and 2.7 nm, and the composite particles obtained in Ex. 7 had a pore size distribution curve having peaks at 7 nm and 9.7 nm.

Ex. 8

Composite particles were obtained in the same manner as in Ex. 1 except that no amino-modified silicone was added, and instead, 3 hours after addition of TEOS, a mixture of 0.93 g of methyltrimethoxysilane (manufactured by KANTO CHEMICAL CO., INC.) and 13.8 g of TEOS was added. A film was produced in the same manner as in Ex. 1 using the obtained composite particles. The pore size distribution curve of the obtained composite particles had no particular peak.

In this Ex., although a sediment was formed after centrifugal separation, as a whole, the sediment was opaque blackish green to such an extent that the interface between the sediment and the supernatant could not visually be confirmed. The yield was 86%, which was low as compared with Ex. 1 to 7, and it is considered that a certain amount of the composite particles were contained in the supernatant without settling.

Ex. 9

Composite particles were obtained in the same manner as in Ex. 1 except that no amino-modified silicone was added, which were further calcined at 500° C. for 2 hours to obtain composite particles. A film was produced in the same manner as in Ex. 1 using the obtained composite particles. The obtained composite particles had a pore size distribution curve having a peak at 2 nm.

Ex. 10

The composite particles obtained in Ex. 9 were surface-treated with a silicone oil in the same manner as in Ex. 4 to obtain composite particles in Ex. 10. A film was produced in the same manner as in Ex. 1 using the obtained composite particles.

Ex. 11

A film (ETFE 100%) was produced in the same manner as in Ex. 1 except that no composite particles were added.

Ex. 12

The same operation as in Ex. 1 was conducted except that the reaction temperature was changed from 35° C. to 45° C., 174.5 g of tetraisopropoxysilane (TiPrOS) was added instead of 137.5 of tetraethoxysilane, and 12.0 g of 3-aminopropyltriethoxysilane was added instead of 9.6 g of the amino-modified silicone.

In Table 1, conditions for production of composite particles in each Ex., the color of the supernatant after the slurry was subjected to centrifugal separation, the amount obtained (amount after drying) and the yield of the composite particles immediately after drying in the drying step, are shown.

In Table 2, the thickness of the film or the like obtained in each Ex., the mass ratio of the composite particles to ETFE, the results of the outer appearance test whether appearance defects were observed or not, and the haze, the visible light transmittance and the solar reflectance at the initial stage and after the weathering test, and Δ solar reflectance are shown.

TABLE 1

| | | Conditions for production of composite particles | | | | | | |
|---|---|---|---|---|---|---|---|---|
| | Amount of TEOS charged (g) | | Amount of TEOS charged (as calculated as $SiO_2$) per 100 parts by mass of $LaB_6$ particles (parts by mass) | | | Silicon compound | | Amount (as calculated as $SiO_2$) charged per 100 parts by mass of silica precursor used for production of composite particles (parts by mass) |
| Ex. | Primary step | Secondary step | Primary step | Secondary step | Total | Type | Amount charged (g) | |
| 1 | 138 | — | 132 | — | 132 | Amino-modified silicone | 9.6 | 24 |
| 2 | 138 | — | 132 | — | 132 | Amino-modified silicone | 9.6 | 24 |
| 3 | 138 | — | 132 | — | 132 | Amino-modified silicone | 9.6 | 24 |
| 4 | 138 | — | 132 | — | 132 | Amino-modified silicone | 9.6 | 24 |
| 5 | 138 | — | 132 | — | 132 | Amino-modified silicone | 9.6 | 24 |
| 6 | 200 | — | 192 | — | 192 | Amino-modified silicone | 14 | 24 |
| 7 | 117 | — | 112 | — | 112 | Amino-modified silicone | 8.1 | 24 |
| 8 | 138 | 13.8 | 132 | 13 | 145 | Methyltrimethoxysilane | 0.93 | 2 |
| 9 | 138 | — | 132 | — | 132 | — | — | — |
| 10 | 138 | — | 132 | — | 132 | — | — | — |
| 11 | — | — | — | — | — | — | — | — |
| 12 | 175 | — | 132 | — | 132 | 3-Aminopropyl triethoxysilane | 12.0 | 16 |

| | Conditions for production of composite particles | | | | | BET specific surface area ($m^2/g$) | Pore volume (mL/g) |
|---|---|---|---|---|---|---|---|
| | Drying | | | | | | |
| Ex. | Centrifugal separation | Drying temperature (° C.) | Calcination | Silicone oil treatment | Color of supernatant after centrifugal separation of slurry | Amount after drying (g) [yield] | |
| 1 | Conducted | 120 | Nil | Nil | Transparent | 108 [99%] | 16 | 0.06 |
| 2 | Conducted | 120 | Conducted (300° C.) | Nil | Transparent | 108 [99%] | 15 | 0.05 |
| 3 | Conducted | 70 | Nil | Nil | Transparent | 109 [100%] | — | — |
| 4 | Conducted | 70 | Nil | Conducted | Transparent | 109 [100%] | — | — |
| 5 | Nil | 120 | Nil | Nil | Transparent | 112 [103%] | 20 | 0.07 |

TABLE 1-continued

| | | | | | | | | |
|---|---|---|---|---|---|---|---|---|
| 6 | Conducted | 120 | Nil | Nil | Transparent | 129 [98%] | 12 | 0.03 |
| 7 | Conducted | 120 | Nil | Nil | Transparent | 98 [97%] | 18 | 0.06 |
| 8 | Conducted | 120 | Nil | Nil | Opaque (blackish green) | 89 [86%] | 21 | 0.05 |
| 9 | Conducted | 120 | Conducted (500° C.) | Nil | Opaque (blackish green) | 83 [83%] | 33 | 0.11 |
| 10 | Conducted | 120 | Conducted (500° C.) | Conducted | Opaque (blackish green) | 83 [83%] | — | — |
| 11 | — | — | — | — | — | — | — | — |
| 12 | Conducted | 70 | Nil | Conducted | Transparent | 100 [88%] | 11 | 0.05 |

TABLE 2

| | | | Initial evaluation | | | After weathering test | | | |
|---|---|---|---|---|---|---|---|---|---|
| Ex. | Content of composite particles per 100 parts by mass of ETFE (part by mass) | Thickness of film or the like (μm) | Haze (%) | Appearance defects | Visible light transmittance (%) | Solar transmittance (%) | Haze (%) | Visible light transmittance (%) | Solar transmittance (%) | Δ Solar transmittance (%) |
| 1 | 0.15 | 249 | 20.9 | Not recognized | 61.8 | 41.1 | 20.7 | 63.1 | 43.5 | 2.4 |
| 2 | 0.22 | 250 | 26.0 | Not recognized | 54.3 | 32.8 | 25.4 | 55.3 | 33.4 | 0.6 |
| 3 | 0.15 | 252 | 20.6 | Not recognized | 62.0 | 41.5 | 19.3 | 64.5 | 45.2 | 3.7 |
| 4 | 0.15 | 245 | 19.1 | Not recognized | 65.2 | 45.7 | 17.8 | 67.6 | 49.8 | 4.1 |
| 5 | 0.22 | 250 | 21.1 | Present | 57.9 | 36.5 | 20.7 | 59.8 | 39.1 | 2.6 |
| 6 | 0.15 | 249 | 23.0 | Not recognized | 67.3 | 50.0 | 20.8 | 70.9 | 55.6 | 5.6 |
| 7 | 0.17 | 250 | 20.6 | Not recognized | 63.2 | 44.1 | 18.8 | 66.3 | 48.4 | 4.8 |
| 8 | 0.15 | 252 | 25.3 | Not recognized | 65.2 | 46.7 | 23.5 | 67.3 | 49.9 | 3.2 |
| 9 | 0.15 | 249 | 41.1 | Present | 64.0 | 44.9 | 28.2 | 75.1 | 70.1 | 25.2 |
| 10 | 0.15 | 252 | 35.0 | Not recognized | 61.7 | 43.7 | 32.9 | 66.3 | 47.5 | 3.8 |
| 11 | — | 247 | 10.0 | Not recognized | 91.0 | 91.9 | 10.2 | 90.6 | 91.7 | −0.2 |
| 12 | 0.15 | 250 | 21.5 | Not recognized | 60.6 | 40.5 | 20.1 | 63.0 | 44.2 | 3.7 |

The films or the like in Ex. 1 to 8 and 12 had an initial haze of at most 30% and maintained sufficiently high transparency even though the composite particles were added. Further, the films had a difference between the initial visible light transmittance (%) and the solar transmittance (%) (initial visible light transmittance–solar transmittance) of at least 15% and had a sufficient infrared shielding property. Further, the films had Δ solar transmittance of at most 7% and were excellent in the weather resistance. Accordingly, the composite particles in Ex. 1 to 8 and 12 were confirmed to be excellent in the weather resistance.

On the other hand, the film or the like in Ex. 9 containing no silicon compound was inferior in the transparency and the weather resistance. Further, the yield of the composite particles was low.

In Ex. 10 in which the composite particles obtained in Ex. 9 were surface-treated with a silicone oil, although the transparency and the weather resistance of the film or the like improved as compared with Ex. 9, the effect was not sufficient.

The film or the like in Ex. 11, which contained no composite particles, was excellent in transparency but had no infrared shielding property.

INDUSTRIAL APPLICABILITY

The composite particles obtained by the production method of the present invention can be used as an infrared shielding agent. For example, by mixing the composite particles with a thermoplastic resin to obtain a thermoplastic resin composition and forming the thermoplastic resin, a formed product having infrared shielding property can be obtained. Further, by dry-blending the composite particles with a powder containing a thermoplastic resin to obtain a thermoplastic resin composition and applying the thermoplastic resin composition as a powder coating material to an object to be coated, a coated article having a coating film having infrared shielding property can be obtained.

Such a formed product and a coated article are useful for applications to which infrared shielding property and its persistence are required. Such applications may, for example, in a case where the formed product is a film or the like, be a membrane structure building, an agricultural covering material or a transparent window material. The membrane structure building is a building at least a part of which, for example, the roof, the wall or the like, is constituted by a membrane material, in which humans live or perform activities, and may, for example, be sport facilities, greenhouses, atriums and commercial facilities. A membrane structure building is required to have transparency in many cases as compared with an agricultural covering material. The formed product obtained by the present invention, which is excellent in the transparency, is suitable for a membrane structure building. However, the application of the formed product is not limited to the above.

This application is a continuation of PCT Application No. PCT/JP2018/016479, filed on Apr. 23, 2018, which is based upon and claims the benefit of priority from Japanese Patent Application No. 2017-091393 filed on May 1, 2017. The contents of those applications are incorporated herein by reference in their entireties.

What is claimed is:

1. A method for producing lanthanum hexaboride-containing composite particles, which comprises:
reacting at least one silica precursor selected from the group consisting of a tetraalkoxysilane, its hydrolysate and its condensate, in the presence of lanthanum hexaboride particles, a base having a boiling point of at most 200° C., water and an organic solvent to obtain a first reaction mixture, and reacting the first reaction mixture with at least one silicon compound selected from the group consisting of an amino-modified silicone, an alkylsilane and an aminosilane, or with the at least one silicon compound and the at least one silica precursor, to obtain a second reaction mixture containing lanthanum hexaboride-containing composite particles.

2. The production method according to claim 1, wherein after the second reaction mixture is obtained, the second reaction mixture is dried to recover the lanthanum hexaboride-containing composite particles.

3. The production method according to claim 2, wherein the second reaction mixture is a dispersion having the lanthanum hexaboride-containing composite particles dispersed in an organic solvent, and the second reaction mixture is subjected to centrifugal separation, a supernatant is removed and a sediment is recovered, and the sediment is dried.

4. The production method according to claim 1, wherein the first reaction mixture contains the at least one silica precursor which remains unreacted.

5. The production method according to claim 1, wherein the reaction of the at least one silica precursor to obtain the first reaction mixture is further carried out in the presence of zirconium oxide particles.

6. The production method according to claim 1, wherein the tetraalkoxysilane is an alkoxysilane having a $C_{1-4}$ alkoxy group.

7. The production method according to claim 1, wherein the tetraalkoxysilane is tetraethoxysilane.

8. The production method according to claim 1, wherein the at least one silicon compound is an amino-modified silicone.

9. The production method according to claim 8, wherein the amino-modified silicone is a side-chain amino-modified silicone, a dual-end amino-modified silicone, a single-end amino-modified silicone or a side-chain dual-end amino-modified silicone.

10. The production method according to claim 8, wherein the amino-modified silicone is a side-chain amino-modified silicone having an amino group-containing organic group introduced to a part of the side chain of dimethylpolysiloxane.

11. The production method according to claim 1, wherein the base having a boiling point of at most 200° C. is ammonia or a primary to tertiary alkylamine.

12. The production method according to claim 1, wherein the base having a boiling point of at most 200° C. is present in an amount such that pH at the time of the reaction to obtain the first reaction mixture is from 8.0 to 12.0.

13. The production method according to claim 1, wherein the average primary particle size of the lanthanum hexaboride-containing composite particles is from 10 to 1,000 nm.

14. A method for producing a formed product, which comprises producing lanthanum hexaboride-containing composite particles by the production method as defined in claim 1, mixing the lanthanum hexaboride-containing composite particles and a thermoplastic resin to obtain a thermoplastic resin composition, and forming the thermoplastic resin composition to obtain a formed product.

15. The production method according to claim 14, wherein the content of the lanthanum hexaboride-containing composite particles is from 0.01 to 1 part by mass per 100 parts by mass of the thermoplastic resin.

16. The production method according to claim 14, wherein the thermoplastic resin is a fluororesin.

* * * * *